US006996656B2

(12) United States Patent
Burton

(10) Patent No.: US 6,996,656 B2
(45) Date of Patent: Feb. 7, 2006

(54) SYSTEM AND METHOD FOR PROVIDING AN ARBITRATED MEMORY BUS IN A HYBRID COMPUTING SYSTEM

(75) Inventor: Lee A. Burton, Colorado Springs, CO (US)

(73) Assignee: SRC Computers, Inc., Colorado Springs, CO (US)

( * ) Notice: Subject to any disclaimer, the term of this patent is extended or adjusted under 35 U.S.C. 154(b) by 0 days.

(21) Appl. No.: 10/284,994

(22) Filed: Oct. 31, 2002

(65) Prior Publication Data

US 2004/0088467 A1    May 6, 2004

(51) Int. Cl.
G06F 13/36 (2006.01)
G06F 13/14 (2006.01)
G06F 12/00 (2006.01)

(52) U.S. Cl. .................. 710/309; 710/113; 710/241; 711/147; 711/158

(58) Field of Classification Search ............. 710/56, 710/305, 107, 113, 114, 264, 25; 711/105, 711/137, 147, 154, 158, 150; 709/213; 712/32; 365/63, 222
See application file for complete search history.

(56) References Cited

U.S. PATENT DOCUMENTS

| | | | | |
|---|---|---|---|---|
| 4,628,488 A | * | 12/1986 | Saku et al. ................. | 365/222 |
| 5,230,057 A | | 7/1993 | Shido et al. | |
| 5,396,602 A | * | 3/1995 | Amini et al. .............. | 710/113 |
| 5,404,538 A | * | 4/1995 | Krappweis, Sr. ........... | 710/264 |
| 5,570,040 A | | 10/1996 | Lytle et al. | |
| 5,737,766 A | | 4/1998 | Tan | |
| 5,892,962 A | | 4/1999 | Cloutier | |
| 5,903,771 A | | 5/1999 | Sgro et al. | |
| 5,905,878 A | * | 5/1999 | LaBerge ................... | 710/114 |
| 5,943,483 A | * | 8/1999 | Solomon ................... | 710/107 |
| 5,953,743 A | * | 9/1999 | Jeddeloh .................... | 711/158 |
| 6,023,755 A | | 2/2000 | Casselman | |
| 6,052,773 A | | 4/2000 | DeHon et al. | |
| 6,076,152 A | | 6/2000 | Huppenthal et al. | |
| 6,085,263 A | * | 7/2000 | Sharma et al. ............. | 710/56 |
| 6,088,761 A | * | 7/2000 | Aybay ....................... | 711/105 |
| 6,192,439 B1 | | 2/2001 | Grunewald et al. | |
| 6,216,191 B1 | * | 4/2001 | Britton et al. ............. | 710/305 |
| 6,226,776 B1 | | 5/2001 | Panchul et al. | |
| 6,243,793 B1 | * | 6/2001 | Aucsmith et al. .......... | 711/151 |
| 6,314,499 B1 | * | 11/2001 | Kermani .................... | 711/147 |
| 6,330,647 B1 | * | 12/2001 | Jeddeloh et al. ........... | 711/158 |
| 6,415,369 B1 | * | 7/2002 | Chodnekar et al. ........ | 711/158 |
| 6,434,687 B1 | * | 8/2002 | Huppenthal ................ | 712/32 |
| 6,594,730 B1 | * | 7/2003 | Hum et al. ................. | 711/137 |
| 6,654,833 B1 | * | 11/2003 | LaBerge .................... | 710/107 |

(Continued)

OTHER PUBLICATIONS

Agarwal, A., et al., "The Raw Compiler Project", pp. 1-12, http://caq-www.lcs.mit.edu/raw, Proceedings of the Second SUIF Compiler W rkshop, Aug. 21-23, 1997.

(Continued)

Primary Examiner—Rehana Perveen
Assistant Examiner—Christopher E. Lee
(74) Attorney, Agent, or Firm—Stuart T. Langley; William J. Kubida; Hogan & Hartson LLP

(57) ABSTRACT

A computing system having at least one microprocessor and a memory subsystem coupled to the at least one microprocessor. A memory controller is coupled to manage memory transactions between the memory subsystem and the at least one microprocessor. At least one arbitration port is coupled to the memory controller and configured to receive an external arbitration signal.

12 Claims, 7 Drawing Sheets

U.S. PATENT DOCUMENTS

| | | | |
|---|---|---|---|
| 6,745,369 B1 * | 6/2004 | May et al. | 716/1 |
| 6,775,718 B2 * | 8/2004 | Saruwatari et al. | 710/25 |
| 6,820,142 B2 * | 11/2004 | Hofstee et al. | 710/25 |
| 2001/0042178 A1 * | 11/2001 | Achilles et al. | 711/150 |
| 2002/0120709 A1 * | 8/2002 | Chow et al. | 709/213 |
| 2003/0061453 A1 * | 3/2003 | Cosky et al. | 711/154 |
| 2003/0101307 A1 * | 5/2003 | Gemelli et al. | 710/305 |
| 2003/0185032 A1 * | 10/2003 | Zagorianakos et al. | 365/63 |

OTHER PUBLICATIONS

Albaharna, Osama, et al., "On the Viability f FPGA-based integrated coprocessors", © 1996 IEEE, Publ. No. 0-8186-7548-Sep. 1996, pp. 206-215.

Amerson, Rick, et al., "Teramac—Configurable Custom Computing", © 1995 IEEE, Publ. No. 0-8186-7086-X/95, pp. 32-38.

Barthel, Dominique Aug. 25-26, 1997, "PVP a Parallel Vide coProcessor", Hot Chips IX, pp. 203-210.

Bertin, Patrice, et al., "Programmable active memories: a perf rmanc assessment", © 1993 Massachusetts Institute of Technology, pp. 88-102.

Bittner, Ray, et al., "Computing kernels implemented with a wormhole RTR CCM", © 1997 IEEE, Publ. No. 0-8186-8159-Apr. 1997, pp. 98-105.

Buell, D., et al. "Splash 2: FPGAs in a Custom Computing Machine—Chapter1—Custom Computing Machines: An Introduction", pp. 1-11, http://www.computer.org/espress/catalog/bp07413/spls-ch1.html (originally believed published in J. of Supercomputing, vol. IX, 1995, pp. 219-230.

Casselman, Steven, "Virtual Computing and The Virtual Computer", © 1993 IEEE, Publ. No. 0-8186-3890-Jul. 1993, pp. 43-48.

Chan, Pak, et al., "Architectural tradeoffs in field-programmable-device-based computing systems", © 1993 IEEE, Publ. No. 0-8186-3890-Jul. 1993, pp. 152-161.

Clark, David, et al., "Supporting FPGA microprocessors through retargetable software tools", © 1996 IEEE, Publ. No. 0-8186-7548-Sep. 1996, pp. 195-103.

Cuccaro, Steven, et al., "The CM-2X: a hybrid CM-2/Xilink prototype", © 1993 IEEE, Publ. No. 0-8186-3890-Jul. 1993, pp. 121-130.

Culbertson, W. Bruce, et al., "Exploring architectures for volume visualization on the Teramac custom computer", © 1996 IEEE, Publ. No. 0-8186-7548-9/96, pp. 80-88.

Culbertson, W. Bruce, et al., "Defect tolerance on the Teramac custom computer", © 1997 IEEE, Publ. No. 0-8186-8159-4/97. pp. 116-123.

Dehon, Andre, "DPGA-Coupled microprocessors: commodity IC for the early 21$^{st}$ century", © 1994 IEEE, Publ. No. 0-8186-5490-2/94, pp. 31-39.

Dehon, A., et al., "Matrix A Reconfigurable Computing Device with Configurable Instruction Distribution", Hot Chips IX, Aug. 25-26, 1997, Stanford, California, MIT Artificial Intelligence Laboratory.

Dhaussy, Philippe, et al., "Global control synthesis for an MIMD/FPGA machine", © 1994 IEEE, Publ. No. 0-8186-5490-2/94, pp. 72-81.

Elliott, Duncan, et al., "Computational Ram: a memory-SIMD hybrid and its application to DSP", © 1992, IEEE, Publ. No. 0-7803-0246-X/92, pp. 30.6.1-30.6.4.

Fortes, Jose, et al., "Systolic arrays, a survey of seven projects", © 1987 IEEE, Publ. No. 0018-9162/87/0700-0091, pp. 91-103.

Gokhale, M., et al., "Processing in Memory: The Terasys Massively Parallel PIM Array" © Apr. 1995, IEEE, pp. 23-31.

Gunther, Bernard, et al., "Assessing Document Relevance with Run-Time Reconfigurable Machines", © 1996 IEEE, Publ. No. 0-8186-7548-9/96, pp. 10-17.

Hagiwara, Hiroshi, et al., "A dynamically microprogrammable computer with low-level parallelism", © 1980 IEEE, Publ. No. 0018-9340/80/07000-0577, pp. 577-594.

Hartenstein, R. W., et al. "A General Approach in System Design Integrating Reconfigurable Accelerators," http://xputers.informatik.uni-kl.de/papers/paper026-1.html, IEEE 1996 Conference, Austin, TX, Oct. 9-11,.

Hartenstein, Reiner, et al., "a reconfigurable data-driven ALU for Xputers", © 1994, IEEE, Publ. No. 0-8186-5490-2/94, pp. 139-146.

Hauser, John, et al.: "GARP: a MIPS processor with a reconfigurable co-processor", © 1997 IEEE, Publ. No. 0-08186-8159-4/97, pp. 12-21.

Hayes, John, et al., "A microprocessor-based hypercube, supercomputer", © 1996 IEEE, Publ. No. 0272-1732/86/1000-0006, pp. 6-17.

Herpel, H.-J., et al., "A Reconfigurable Computer for Embedded Contr l Applications", © 1993 IEEE, Publ. No. 0-8186-3890-7/93, pp. 111-120.

Hogl, H., t al., "Enable++: A second generation FPGA processor", © 1995 IEEE, Publ. No. 0-8186-7086-X/95, pp. 45-53.

King, William, et al., "Using MORRPH in an industrial machine vision system", © 1996 IEEE, Publ. No. 08186-7548-9/96, pp. 18-26.

Manohar, Swaminathan, et al., "A pragmatic approach to systolic design", © 1988 IEEE, Publ. No. CH2603-9/88/0000/0463. pp. 463-472.

Mauduit, Nicolas, et al., "Lneuro 1.0: a piece of hardware LEGO for building neural network systems," © 1992 IEEE, Publ. No. 1045-9227/92, pp. 414-422.

Mirsky, Ethan A., "Coarse-Grain Reconfigurable Computing", Massachusetts Institute of Technology, Jun. 1996.

Mirsky, Ethan, et al., "MATRIX: A Reconfigurable Computing Architecture with Configurable Instruction Distribution and Deployable Resources", © 1996 IEEE, Publ. No. 0-8186-7548-9/96, pp. 157-166.

Morley, Robert E., Jr., et al., "A Massively Parallel Systolic Array Processor System", © 1988 IEEE, Publ. No. CH2603-9/88/0000/0217, pp. 217-225.

Patterson, David, et al., "A case for Intelligent DRAM: IRAM", Hot Chips VIII, Aug. 19-20, 1996, pp. 75-94.

Peterson, Janes, et al., "Scheduling and partitioning ANSI-C programs onto multi-FPGA CCM architectures", © 1996 IEEE, Publ. No. 0-8186-7548-9/96, pp. 178-187.

Schmit, Herman, "Incremental reconfiguration for pipelined applications," © 1997 IEEE, Publ. No. 0-8186-8159-4/97, pp. 47-55.

Sitkoff, Nathan, et al., "Implementing a Genetic Algorithm on a Parallel Custom Computing Machine", Publ. No. 0-8186-7086-X/95, pp. 180-187.

Stone, Harold, "A logic-in-memory computer", © 1970 IEEE, IEEE Transactions on Computers, pp. 73-78, Jan. 1990.

Tangen, Uwe, et al., "A parallel hardware evolvable computer POLYP extended abstract", © 1997 IEEE, Publ. No. 0-8186-8159/4/97, pp. 238-239.

Thornburg, Mike, et al., "Transformable Computers", © 1994 IEEE, Publ. No. 0-8186-5602-6/94, pp. 674-679.

Tomita, Shinji, et al., "A computer low-level parallelism QA-2", © 1986 IEEE, Publ. No. 0-0384-7495/86/0000/0280, pp. 280-289.

Trimberger, Steve, et al., "A time-multiplexed FPGA", © 1997 IEEE, Publ. No. 0-8186-8159-4/97, pp. 22-28.

Ueda, Hirotada, et al., "Multiprocessor system utilizing enhanced DSP's for image processing", © 1988 IEEE, Publ. No. CH2603-9/88/0000/0611, pp. 611-620.

Villasenor, John, et al., "Configurable computing", © 1997 Scientific American, Jun. 1997.

Wang, Quiang, et al., "Automated field-programmable compute accelerator design using partial evaluation", © 1997 IEEE, Publ. No. 0-8186-8159-4/97, pp. 145-154.

W.H. Mangione-Smith and B.L. Hutchings. Configurable computing: The Road Ahead. In Proceedings of the Reconfigurable Architectures Workshop (RAW'97), pp. 81-96, 1997.

Wirthlin, Michael, et al., "The Nano processor: a low resource reconfigurable processor", © 1994 IEEE, Publ. No. 0-8186-5490-2/94, pp. 23-30.

Wirthlin, Michael, et al., "A dynamic instruction set computer", © 1995 IEEE, Publ. No. 0-8186-7086-X/95, pp. 99-107.

Witting, Ralph, et al., "One Chip: An FPGA processor with reconfigurable logic", © 1996 IEEE, Publ. No. 0-8186-7548-9/96, pp. 126-135.

Yamauchi, Tsukasa, et al., "SOP: A reconfigurable massively parallel system and its control-data flow based compiling method", © 1996 IEEE, Publ. No. 0-8186-7548-9/96, pp. 148-156.

"Information Brief", PCI Bus Technology, © IBM Personal Computer Company, 1997, pp. 1-3.

Yun, Hyun-Kyu and Silverman, H. F.; "A distributed memory MIMD multi-computer with reconfigurable custom computing capabilities", Brown University, Dec. 10-13, 1997, pp. 7-13.

Hoover, Chris and Hart, David; "San Diego Supercomputer Center, Timelogic and Sun Validate Ultra-Fast Hidden Markov Model Analysis-One DeCypher-accelerated Sun Fire 6800 beats 2,600 CPUs running Linux-", San Diego Supercomputer Center, http://www.sdsc.edu/Press/02/050802 markovmodel.html, May 8, 2002, pp. 1-3.

Caliga, David and Barker, David Peter, "Delivering Acceleration: The Potential for Increased HPC Application Performance Using Reconfigurabl Logic ", SRC Computers, Inc., Nov. 2001, pp. 20.

Hammes, J.P., Rinker, R. E., McClure, D. M., Böhm, A. P. W., Najjar, W. A., "The SA-C Compiler Dataflow Description", Colorado State University, Jun. 21, 2001, pp. 1-25.

Callahan, Timothy J. and Wawrzynek, John, "Adapting Software Pipelining for Reconfigurable Computing", University of California at Berkeley, Nov. 17-19, 2000, pp. 8.

Ratha, Nalini K., Jain, Anil K. and Rover, Diane T., "An FPGA-based Point Pattern Matching Processor with Application to Fingerprint Matching", Michigan State Unversity, Department of Computer Science, pp. 8.

Dehon, André, "Comparing Computing Machines", University of California at Berkeley, Proceedings of SPIE vol. 3526, Nov. 2-3, 1998, pp. 11.

Vemuri, Ranga R. and Harr, Randolph E., "Configurable Computing: Technology and Applications", University of Cincinnati and Synopsys Inc., IEEE, Apr. 2000, pp. 39-40.

Dehon André , "The Density Advantage of Configurable Computing", California Institute of Technology, IEEE, Apr. 2000, pp. 41-49.

Haynes, Simon D., Stone, John, Cheung, Peter Y.K. and Luk, Wayne, "Video Image Processing with the Sonic Architecture", Sony Broadcast & Profoessional Europe, Imperial College, University of London, IEEE, Apr. 2000, pp. 50-57.

Platzner, Marco, "Reconfigurable Accelerators for Combinatorial Problems", Swiss Feral Institute of Technology (ETH) Zurich, IEEE, Apr. 2000, pp. 58-60.

Callahan, Timothy J., Hauser, John R. and Wawrzynek, John, "The Garp Architecture and C Compiler", University of California, Berkeley, IEEE, Apr. 2000. pp. 62-69.

Goldstein, Seth Copen, Schmit, Herman, Budiu, Mihai, Cadambi, Srihari, Moem Matt abd Taylor, R. Reed, "PipeRench: A Reconfigurable Architecture and Compiler", Carnegie mellon University, IEEE, Apr. 2000, pp. 70-76.

Muchnick, Steven S., "Advanced Compiler Design and Implementation", Morgan Kaufmann Publishers, pp. 217.

Hammes, Jeffrey P., Dissertation "Compiling SA-C To Reconfigurable Computing Systems", Colorado Stat University, Department of Computer Science, Summer 2000, pp. 179.

Automatic Target Recognition, Colorado State University & USAF, http://www.cs.colostate.edu/cameron/applications, html, pp. 1-3.

Chodowiec, Pawel, Khuon, Po, Gaj, Kris, Fast Implementations of Secret-Key Block Ciphers Using Mixed Inner-and Outer-Round Pipelining, George Mason University, Feb. 11-13, 2001, pp. 9.

* cited by examiner

SYSTEM AND METHOD FOR PROVIDING AN ARBITRATED MEMORY BUS IN A HYBRID COMPUTING SYSTEM

CROSS REFERENCE TO RELATED PATENT APPLICATIONS

The present invention is related to U.S. patent application Ser. No. 09/755,744 filed Jan. 5, 2001 for: "Multiprocessor Computer Architecture Incorporating a Plurality of Memory Algorithm Processors in the Memory Subsystem" which is a divisional application of U.S. patent application Ser. No. 09/481,902 filed Jan. 12, 2000 (now U.S. Pat. No. 6,247,110) which is a continuation application of U.S. patent application Ser. No. 08/992,763 filed Dec. 17, 1997 (now U.S. Pat. No. 6,076,152). The present invention is also related to the subject matter of U.S. Pat. No. 6,339,819 issued Jan. 15, 1992 for: "Multiprocessor with Each Processor Element Accessing Operands in Loaded Input Buffer and Forwarding Results to FIFO Output Buffer". The foregoing patent application and issued patents are assigned to SRC Computers, Inc., assignee of the present invention, the disclosures of which are herein specifically incorporated in their entirety by this reference.

BACKGROUND OF THE INVENTION

1. Field of the Invention

The present invention relates, in general, to the field of computer systems and techniques for interconnecting various processing or computing elements. More particularly, the present invention relates to a computer system architecture and memory controller having an arbitration interface enabling external devices to access system memory resources cooperatively.

2. Relevant Background

Conventional computer system architecture for single-processor systems include a microprocessor that communicates with other devices through a "system chipset". The system chipset implements various input/output and controller functions that enable the microprocessor to communicate with external devices such as memory, mass storage, display devices, network interfaces, printers, and the like. A typical system chipset will implement an interface to the microprocessor often referred to as a "front side bus" or "FSB" that couples to high-speed, low-latency, or bandwidth intensive components such as memory. The chipset implements a secondary interface, often referred to as a "peripheral bus" that operates at a lower speed couples to lower speed devices such as mass storage controllers, printers, network interfaces, and the like.

The system chipset is often produced as multiple specialized components. In a typical configuration, a "north bridge" component implements the microprocessor interface and an interface to the memory subsystem. A "south bridge" component implements the peripheral interface. The north bridge and south bridge components are coupled to bridge the peripheral interface with the microprocessor interface. The interface between the microprocessor and memory is a particularly constrained interface for most applications. In most personal computer architectures, it is assumed that one device will have exclusive access to the FSB (e.g., the single microprocessor being coupled to the FSB). Because of this, all memory transactions must be implemented through a port to the north bridge chip. This increases the system memory access time for the external devices. In the case of hybrid computing systems in which the external device is an adaptive processor, this increase in access time reduces the performance benefits of the hybrid system.

In many cases, a direct memory access (DMA) controller is implemented on the peripheral bus, within the north bridge device, or through a DMA port on the north bridge component to manage memory transactions between the peripheral bus and the memory subsystem. DMA controllers are typically designed to support memory transactions with lower speed peripherals coupled through the south bridge device, as opposed to devices that require significant memory bandwidth such as external processors. In other words, the DMA controller supports peripheral memory activity, and so operates at the slower peripheral interface speeds. While DMA controllers relieve the microprocessor from handling all memory operations, the slower speed interface limits the ability to access the memory subsystem at speeds similar to those available to the microprocessor.

The north bridge of a traditional computer system internally arbitrates between the processor, the graphics port, and peripheral devices and DMA controller for access to the system memory bus. Currently, system chipsets do not provide external access to the arbitration logic. Hence, external devices that desire to access the memory subsystem are constrained to use the arbitration mechanisms implemented by the north bridge component.

SMP (symmetric multiprocessing) refers to systems that execute programs using multiple processors that share a common operating system and memory. In symmetric multiprocessing, the processors share memory and the I/O bus or data path. A single copy of the operating system is in charge of all the processors. Because conventional computing system architectures do not enable multiple devices to access the memory bus, implementing systems in which multiple processors share memory is difficult. As a result, SMP systems based on mass-produced components that are designed for conventional architectures have used lower-speed access granted at peripheral bus speeds, or implemented processing components within the memory subsystem. An example of the later implementation is the multi-adaptive processor (MAP™) described in commonly assigned U.S. Pat. No. 6,247,110 (MAP is a trademark or registered trademark of SRC Computers, Inc.).

In view of the above, it is apparent that a need exists for a computing system that exposes the arbitration mechanisms to enable access to a memory subsystem at high speed. Moreover, there is a particular need for system chipset architectures that utilize an externally provided arbitration signal such that a memory subsystem bus can be accessed by multiple agents such as multiple processors and other components that couple to the memory subsystem bus.

SUMMARY OF THE INVENTION

Briefly stated, the present invention involves a computing system having at least one microprocessor and a memory subsystem coupled to the at least one microprocessor. A memory controller is coupled to manage memory transactions between the memory subsystem and the at least one microprocessor. At least one arbitration port is coupled to the memory controller and configured to receive an external arbitration signal.

DETAILED DESCRIPTION OF THE PREFERRED EMBODIMENTS

The present invention involves multiprocessor and hybrid computer systems, including symmetric multiprocessing (SMP) computing systems that enable shared access to system memory from the various processes. In exemplary implementations of the present invention, substantially conventional system chipsets are modified to expose internal arbitration logic to external devices. In this manner, one or more external devices, such as adaptive processors, have a direct link to the system memory without need to access system memory through the system chipset. In other implementations, arbitration logic is implemented in devices external to the system chipset, in which case the system chipset is modified to arbitrate for memory system access rather than assume it has exclusive access. In either case, modifications to the system chipset are minimal, and an arbitration signal bus or port may be implemented with as few as two or three connections to the system chipset.

Figure 1:
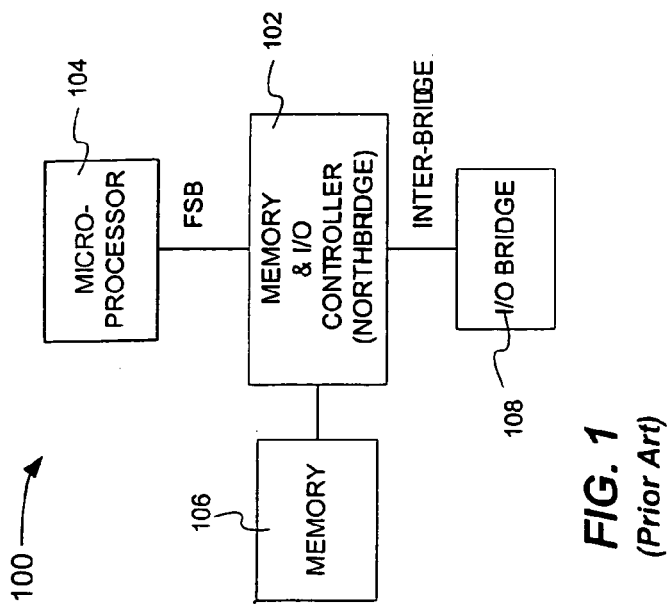
FIG. 1 shows a functional block diagram of a typical computing system implemented with a microprocessor, memory and a system chipset including a ("North Bridge") and a peripheral bus controller ("South Bridge")

FIG. 1 shows a high-level functional block diagram of a typical computing system 100 is shown. The computing system 100 may be, for example, a personal computer ("PC") architecture that incorporates a commercially available integrated circuit ("IC") memory controller ("north bridge") 102 such as the P4X333/P4X400 devices available from VIA Technologies, Inc.; the M1647 device available from Acer Labs, Inc. and the 824430X device available from Intel Corporation. North bridge 102 is coupled by means of a front side bus ("FSB") to a processor 104 such as one of the Intel® Pentium® series or Xeon™ series of processors also available from Intel Corporation. North bridge 102 is coupled via a memory bus to system memory 106, which comprises, for example, an arrangement of synchronous dynamic random access ("SDRAM") memory modules. Other memory configurations and devices such as double data rate (DDR) SDRAM, RDRAM and DRDRAM by Rambus Corporation, Enhanced SDRAM (ESDRAM) produced by Ramtron International Corporation, and the like. As noted hereinbefore, conventional north bridge components are configured to support a single processor 104 over the FSB, which makes adding additional processors difficult. Even where the system chipset support multiple processors coupled to the FSB, as described in alternative embodiments, the FSB architecture is very specific to a particular processor type. Hence, coupling advanced or special-purpose processing devices such as an adaptive processor in a manner that gives the adaptive processor suitable access to the memory subsystem 106 has been difficult or impossible.

In some implementations, a dedicated accelerated graphics port ("AGP"), not shown, is provided for interfacing system 100 to external graphics processing components while an inter-bridge bus couples north bridge IC 102 to a "south bridge" 108. The north bridge 102 and south bridge 108 are together referred to as a system chipset as they are typically designed to work together to provide desired system I/O functionality. The allocation of functionality between the components of a chipset may be altered between implementations, and some or all of the I/O functionality may be integrated into a microprocessor 104 as in the case of a microcontroller. For purposes of the present invention, it is sufficient to note that the north bridge component 102 handles the high-speed I/O functions typically associated with accessing a memory subsystem.

South bridge 108 may be implemented by, for example, an SLC90E66 device available from Standard Microsystems, Corporation or the VT8235 device available from VIA Technologies. South bridge 108 implements a variety of I/O interfaces and ports that couple system 100 to, for example, a peripheral component interconnect ("PCI") bus, universal serial bus (USB), IEEE 1394 port, system management ("SM") bus, general purpose ("GP") I/O as well as industry standard architecture/extended I/O ("ISA/EIO") bus and the like. South bridge 108 may also implement special purpose ports to graphics devices, audio devices, local area network devices, disk drives, flash memory, and the like depending on the needs of a particular application. In general, the interfaces of south bridge 108 handle slower, narrow bandwidth I/O as compared to north bridge 102.

In contrast with the architecture shown in FIG. 1, the hybrid computing systems shown in FIG. 2–FIG. 7 illustrate various implementation that enable external processing devices to share access to a memory subsystem. Hybrid computer systems are those that incorporate both standard microprocessors and adaptive processors. These are typically large multiprocessor server-type systems that reside on a shared network. The overall performance and flexibility of such systems is directly proportional to the level of coupling between the microprocessors and the adaptive processors and system memory. When the disparate processor types are treated as peers and have balanced (e.g., substantially equal) bandwidths and latencies to a shared memory, the system performance will usually be maximized. In general, the implementations shown in FIG. 2–FIG. 7 provide an arbitration port and arbitration mechanism that enables an external processor to cooperatively share access to a memory subsystem to achieve such balanced access.

Figure 2:
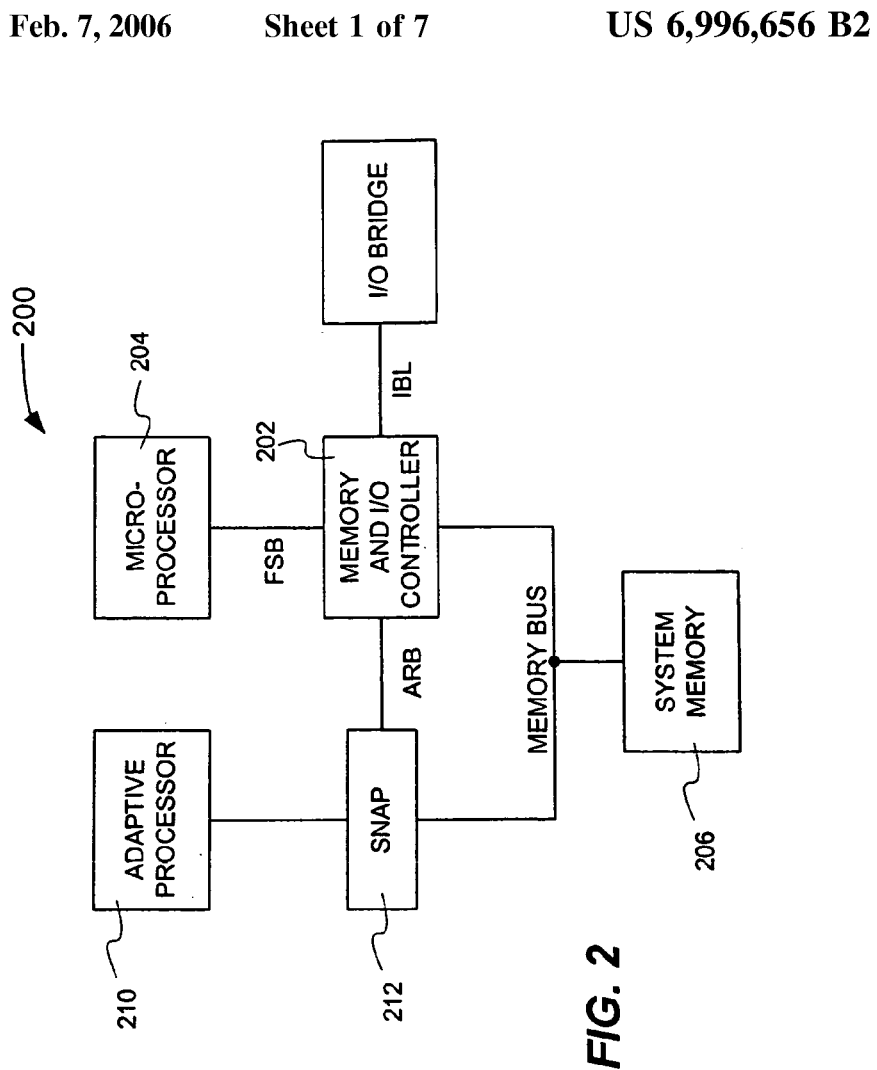
FIG. 2 illustrates a functional block diagram of a memory-connected hybrid computing system including a microprocessor and an adaptive processor coupled to system memory in accordance with the present invention.

For example, in FIG. 2, system 200 expands on the typical computer system 100 by adding an adaptive processor 210 coupled to the system memory bus through a system/network adapter port (SNAP) 212. An adaptive processor such as a multi-adaptive processor (MAP) introduced by SRC Computers, Inc, provide users the capability of having hardware logic-implemented functions, which can greatly accelerate application algorithms over what is otherwise implemented in software within a conventional microprocessor 204. Details of an exemplary SNAP implementation and functionality are described in U.S. patent application Ser. No. 09/932,330 filed Aug. 17, 2001 for: "Switch/Network Adapter Port for Clustered Computers Employing a Chain of Multi-Adaptive Processors in a Dual In-Line Memory Module Format" assigned to SRC Computers, Inc., Colorado, Springs, Colo., assignee of the present invention, the disclosure of which is herein specifically incorporated in its entirety by this reference. SNAP 212 is typically placed in a DIMM slot of a computer system, and is thereby coupled to the memory bus. While SNAP 212 is implemented on the memory subsystem and occupies memory address space, it is a configurable device that can be configured to perform processing and I/O functions. Although a SNAP 212 is closely coupled to the memory system 206, it exhibits some overhead in conducting memory transactions as a result of its "slave" with respect to the memory bus. However, this overhead minimally impacts overall performance because as the overhead incurred when setting up the arbitration signal port is spread out over all the memory transactions that are processed by adaptive processor 210.

In hybrid system 200, memory and I/O controller 202, implemented as a north bridge chip in the example, can no longer assume that microprocessor 204 will be the only agent that will have control of system memory 206. Adaptive processor 210 requires shared access to system memory 206 to begin memory transactions (i.e., read, write, modify, lock, unlock, and the like). In accordance with this implementation of the present invention, arbitration logic within memory and I/O controller 202 is provided with an external arbitration port to communicate arbitration signals between SNAP 212 and memory and I/O controller 202. The arbitration signals comprise, in a particular example, a relatively simple request/grant scheme in which a request signal is asserted by an agent that seeks memory system access, and a grant signal is asserted by the arbitration logic to the agent that currently has access to the memory subsystem. As the arbitration logic within a conventional north bridge chip already includes logic for such decision making, it is a relatively straightforward effort to provide a port (e.g., I/O pins, driver mechanisms, and perhaps buffers) for external arbitration signals called for by the present invention.

In operation, for an adaptive processor to become an arbitrating agent on the system memory bus of hybrid system, some motherboard layout changes would be needed. A Switch Network Adapter Port (SNAP) would be placed in one of the DIMM slots in the system. An additional header is added to the motherboard to provide connections to the chip selects of the other DIMM modules in the system. SNAP connects into this header are provided through a ribbon cable. This header would be 18 to 20 pins in size, for example. In a conventional computer system 100, this header is unused and not populated on the motherboard. From this slot, SNAP 212 drives the address and command information to the other DIMM's in the system. Data is transferred to and from SNAP 212 across the data lines common to all DIMMs. The standard SSTL2 interface used in SDRAM's allows for multiple drivers to be present on the bus, thus the present invention may be implemented without requiring additional tri-state capability. As a result, the present invention contemplates minor modifications of the system chipset and motherboard and no modifications of conventional DIMM memory components.

In particular implementations of the present invention, the north bridge 202 is designed to be compatible with conventional systems such a system 100 in FIG. 1. Such compatibility enables the manufacture of a single IC that meets the demands of both conventional system 100 and hybrid system 200, typically resulting in more efficient manufacturing. In such an implementation, the request line can be tied to an inactive state for conventional systems 100, which would make the memory and I/O controller the sole agent arbitrating for memory system access.

With an ability to access memory subsystem 206 directly, the additional agents such as adaptive processor 210 see a low latency, and higher bandwidth memory accesses. In addition, microprocessor 204 is not needed in the data movement to adaptive processor 210, thus freeing microprocessor 204 to perform other non-memory related tasks.

Figure 3:
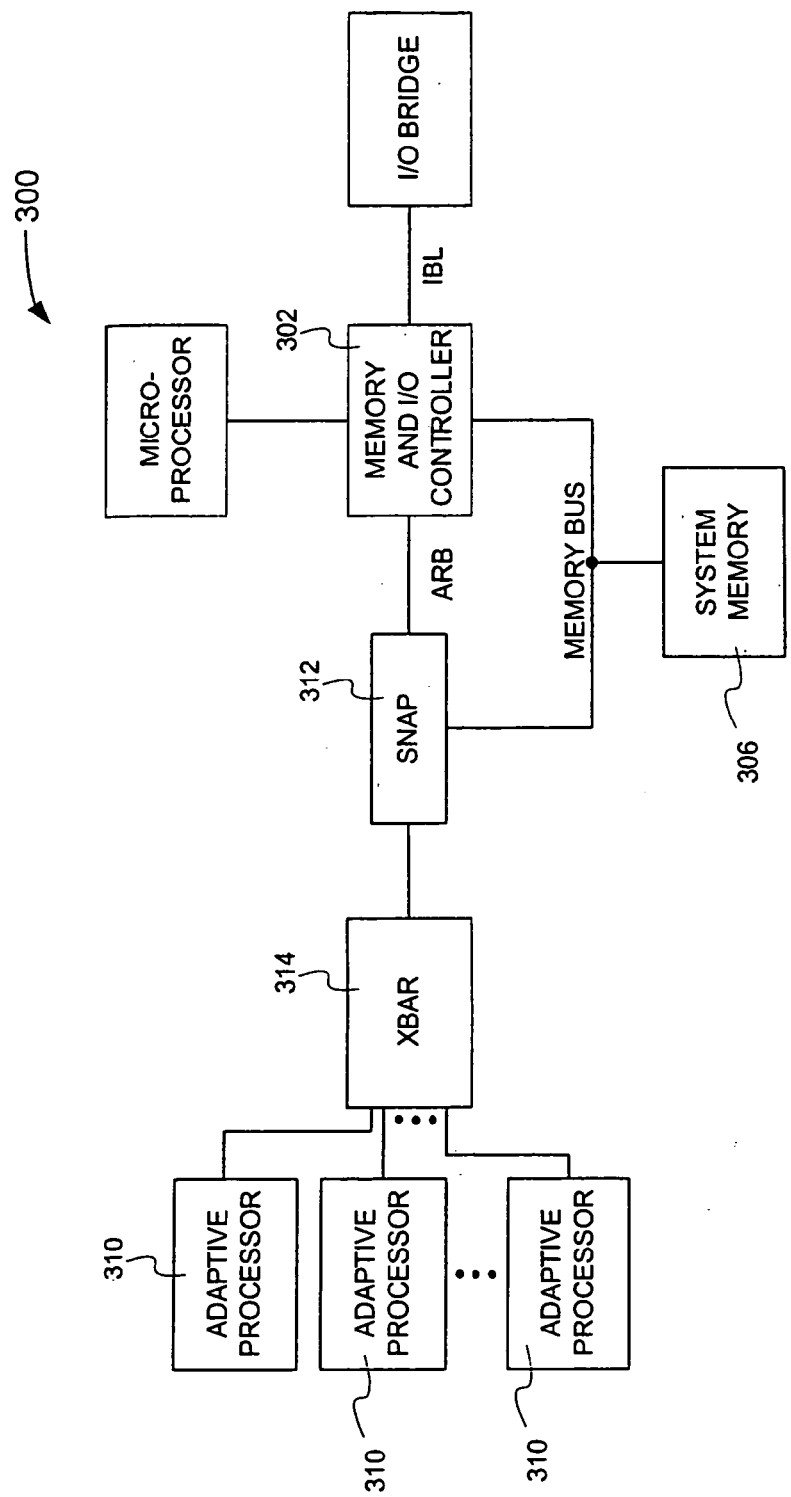
FIG. 3 is a functional block diagram of an alternative embodiment hybrid computing system in accordance with the present invention having one or more adaptive processors coupled to shared system memory with a microprocessor.

FIG. 3 illustrates another embodiment of a hybrid system 300 in which the present invention is implemented. In the embodiment of FIG. 3, multiple adaptive processors 310 are provided using a crossbar 314 to couple to SNAP 312. Although not shown, more than one SNAP 312 and microprocessor system can be connected into the crossbar switch 314. Adaptive processors 310 are substantially equivalent to processor 210 in the description of FIG. 2, and SNAP device 312 is substantially equivalent to SNAP 212 in FIG. 2. In the implementation of FIG. 3, crossbar 314 selectively couples one adaptive processor 310 to SNAP 312 such that from the perspective of SNAP 312, a single adaptive processor 310 is connected. In this manner, SNAP 312 can be programmed to couple adaptive processors 310 to the memory bus and memory subsystem 306 is a manner substantially equivalent to that described in the implementation of FIG. 2. Crossbar 314 will require some form of arbitration/control to select a specific processor 310 to couple to SNAP 312. In a particular example, this control function is implemented in the SNAP 312 interface and leverages control functions defined for communication with adaptive processors 310, hence, no additional wiring or resources are required to implemented control of crossbar 314. This can be implemented, for example, by logic configured within one or more of adaptive processors 310, or by an external management agent (not shown). Alternatively, crossbar 314 may implement a round-robin selection of adaptive processors 310 to implement a time-sharing like algorithm for access to system memory 306.

Figure 4:
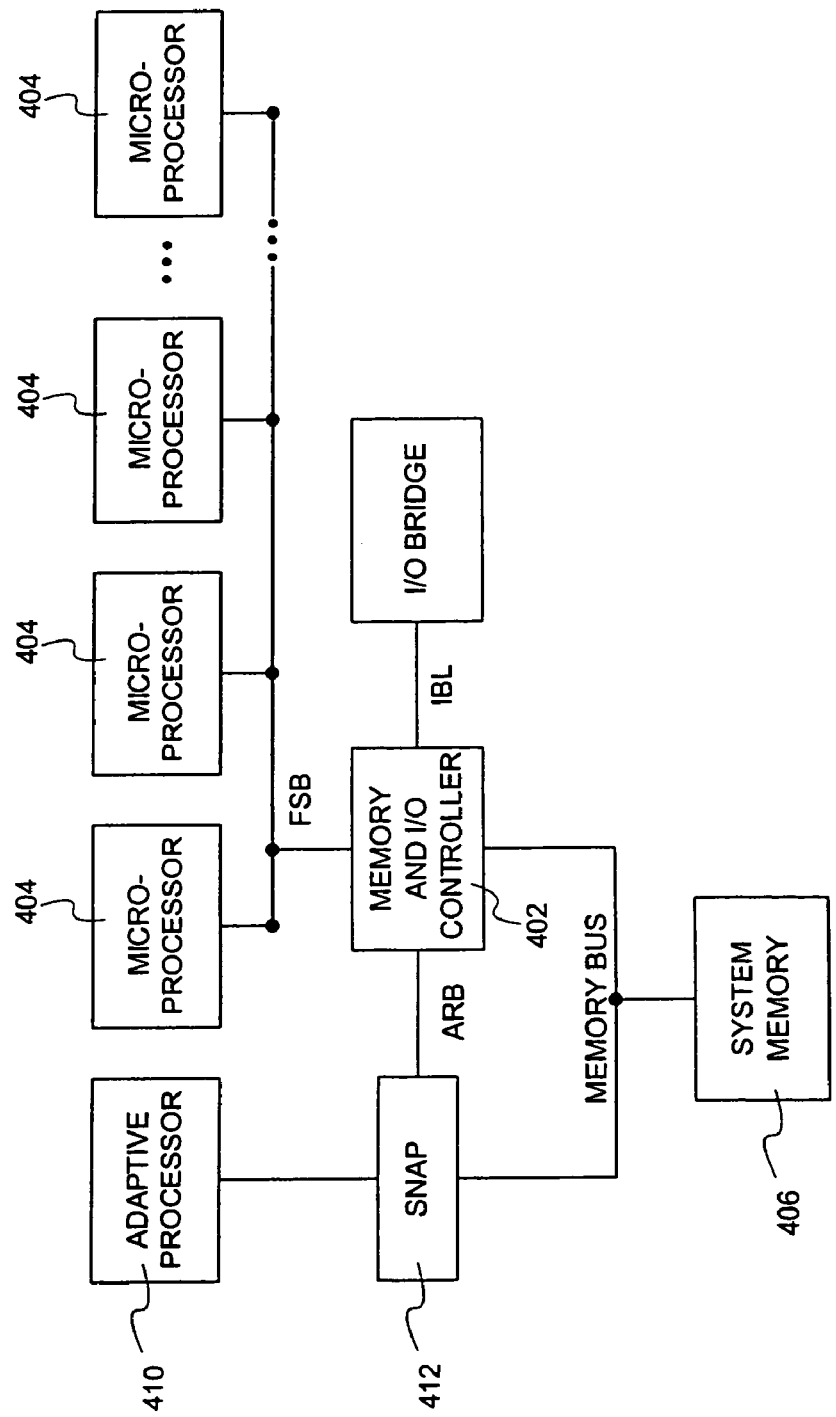
FIG. 4 shows a functional block diagram of a hybrid symmetrical multiprocessing (SMP) computing system in accordance with the present invention in which a memory system arbiter mechanism and port is implemented in the north bridge component of the system chipset.

FIG. 4 illustrates a hybrid system that differs from that shown in FIG. 2 in that a plurality of processors 404 are coupled to the FSB in combination with external access to the memory bus. Adaptive processors 410 are substantially equivalent to processor 210 in the description of FIG. 2, and SNAP device 412 is substantially equivalent to SNAP 212 in FIG. 2. Some system chipsets include a memory and I/O controller 402 that can interface with multiple microprocessors 404 on the FSB. The memory transactions generated by microprocessors 404 are arbitrated with transaction requests from adaptive processor 410 to enable shared access to system memory 406. Memory and I/O controller 402 may implement equal access to all processors 404 and 410, or may offer preferred access to some. For example, all of the microprocessors 404 together may bet 50% access, while the remaining 50% is allocated to adaptive processor 410. Enabling variable access bandwidth may require some modifications to the arbitration logic within memory and I/O controller 402. It is contemplated that the programming within SNAP 412 may also be modified to account for more demanding access by processors 404, for example, by regulating or governing the frequency with which adaptive processor 410 is allowed to access system memory 406.

Figure 5:
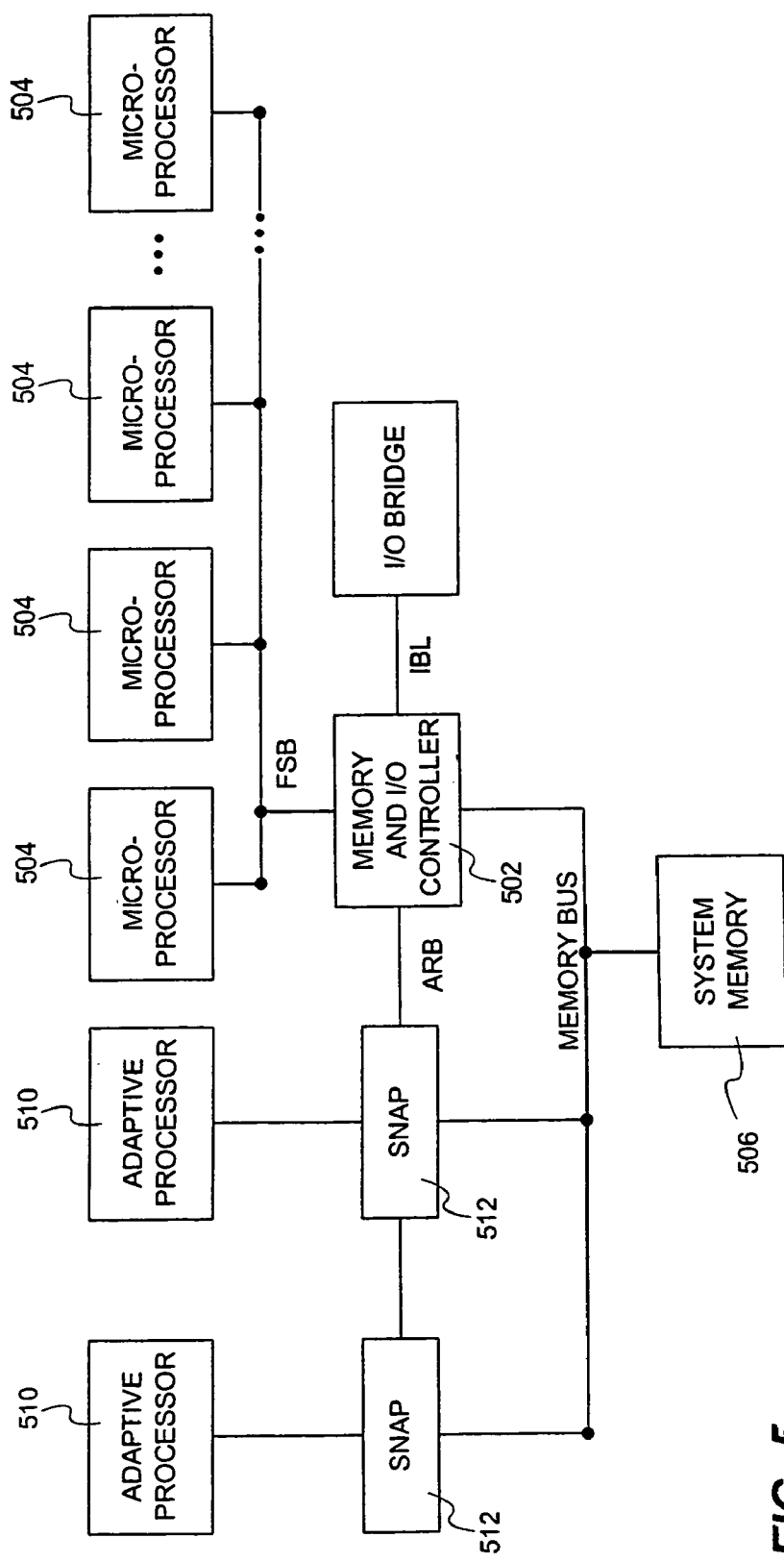
FIG. 5 illustrates a functional block diagram of an alternative configuration hybrid SMP computing system having multiple adaptive processors coupled to an arbitrated-access shared memory subsystem in accordance with the present invention.

FIG. 5 illustrates an implementation in which multiple processors 504 share FSB access to memory and I/O controller 502 while multiple adaptive processors 510 access memory and I/O controller 502 through SNAPs 512. Because SNAP devices 512 are configurable, they can be configured to operate in parallel. SNAP-to-SNAP connection 512 may be a physical connection, or a virtual connection implemented through memory commands. Each adaptive processor 510 has access to the memory bus and therefore arbitrated access to system memory 506. The implementation of FIG. 5 leverages the arbitration mechanisms within memory and I/O controller 502 which include the ability to arbitrate amongst multiple requesting agents. SNAPs 512 include mechanisms to coordinate memory bus access amongst themselves, and may include mechanisms to self-govern the frequency with which memory bus accesses are asserted to account for increased access by multiple microprocessors 504.

Figure 6:
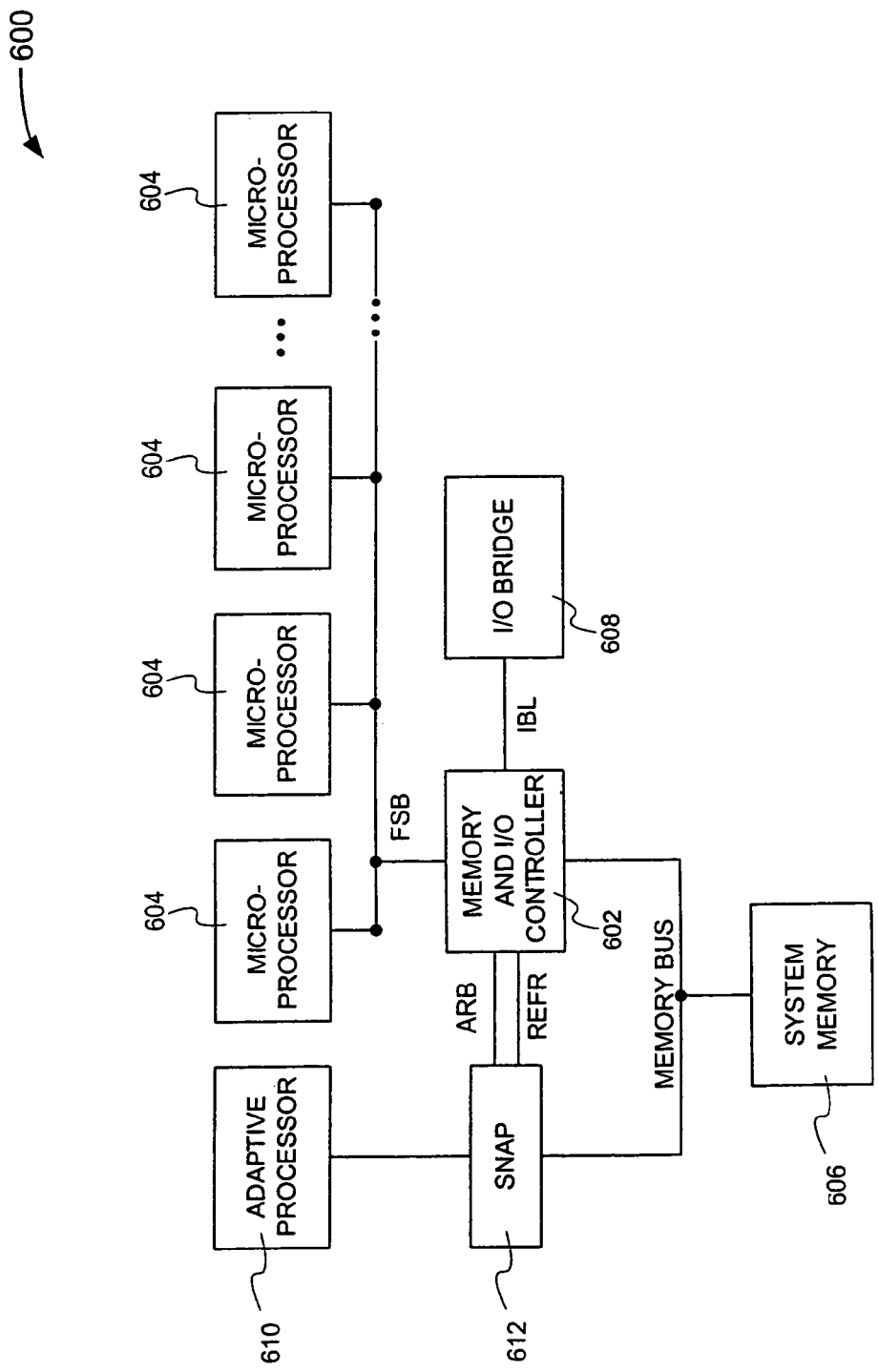
FIG. 6 shows a functional block diagram of an alternative embodiment hybrid SMP computing system having memory system access arbitration mechanisms implemented in a switch/network adapter port (SNAP) implemented in a in accordance with the present invention.
Figure 7:
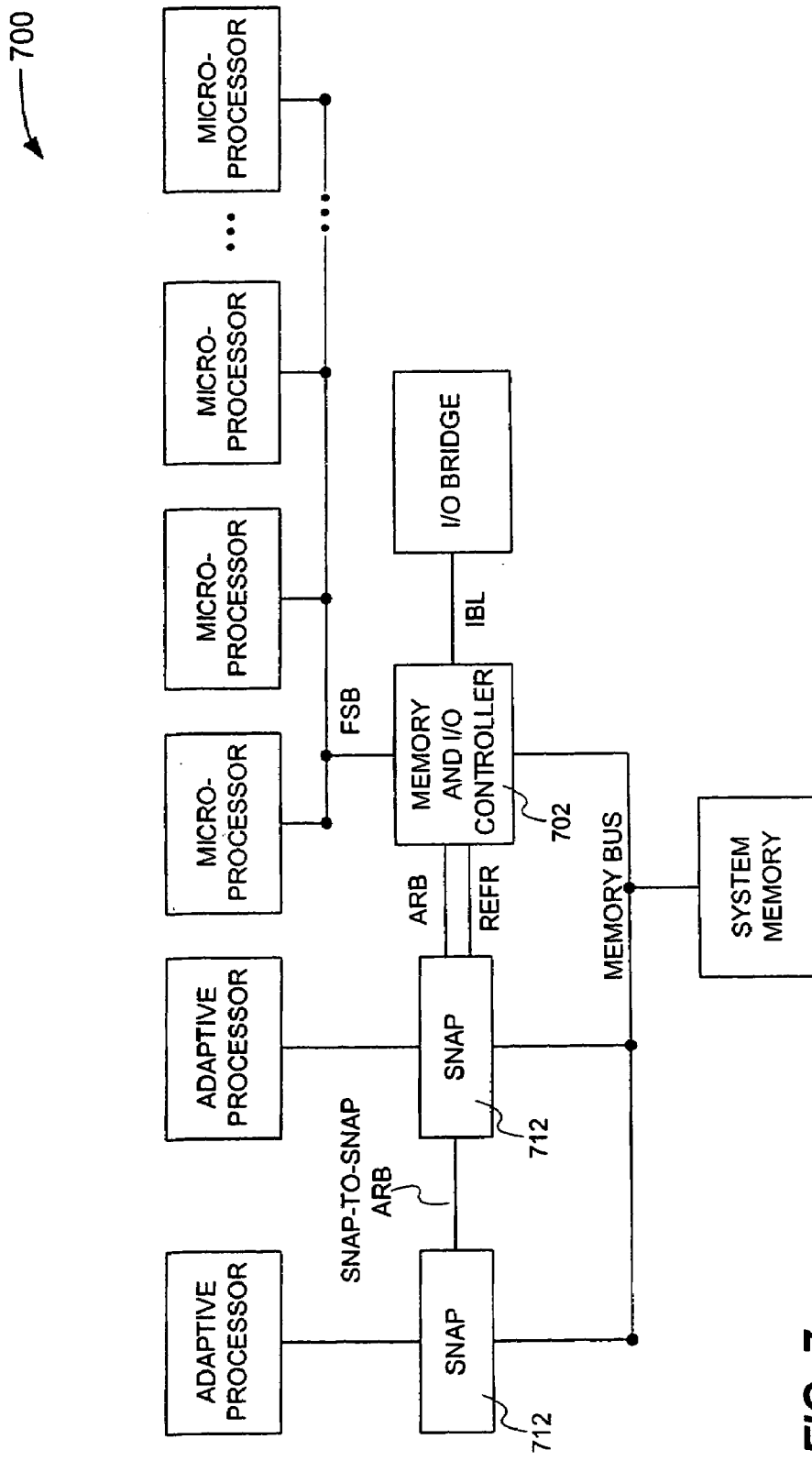
FIG. 7 is a functional block diagram of another alternative embodiment hybrid SMP computing system having multiple adaptive processors with memory system access arbitration mechanisms implemented in a switch/network adapter port (SNAP) implemented in a in accordance with the present invention.

FIG. 6 and FIG. 7 illustrate exemplary embodiments in which arbitration control logic is implemented within a SNAP 612 or SNAP 712 rather than relying entirely on arbitration logic within a memory and I/O controller 602 or 702. In some cases, the manufacturer of memory and I/O controller 602/702 may provide external access to the memory bus without direct access to the arbitration mechanisms. In this case, arbitration logic within SNAPs 612 and 712 will monitor the memory refresh signal on the memory bus. In a particular implementation, the memory refresh control is retained in the north bridge component 602/702 so that it remains compatible with conventional computer systems.

FIG. 6 is a SMP computer system 600 that is similar to that shown in FIG. 4, but differs in that SNAP 612 implements arbitration logic external to memory and I/O controller 602. This external arbitration logic enables adaptive processor 610 to access memory subsystem 606. The memory and I/O component 602 asserts a request signal when an access to system memory is pending from one of microprocessors 604 or I/O bridge 608. Memory refresh is implemented by causing memory and I/O component 602 to assert a refresh signal to SNAP 612 before a refresh cycle. On the next command cycle following the refresh signal, the memory refresh mechanisms within memory and I/O component 606 controls the memory bus to perform refresh of system memory 606.

FIG. 7 shows a SMP computer system 700 that is similar to that shown in FIG. 5, but differs in that SNAP 712 implements arbitration logic external to memory and I/O controller 702. Like the implementation of FIG. 6, the use of external arbitration logic is implemented by providing a refresh signal from memory and I/O controller 702 to at least one SNAP 712 so that refresh functionality is retained by memory and I/O controller 702. To use memory and I/O controller 702 in a conventional computer system 100, the grant line is tied to a signal level indicating that the memory and I/O controller 702 is in control of the memory bus.

Figure 8:
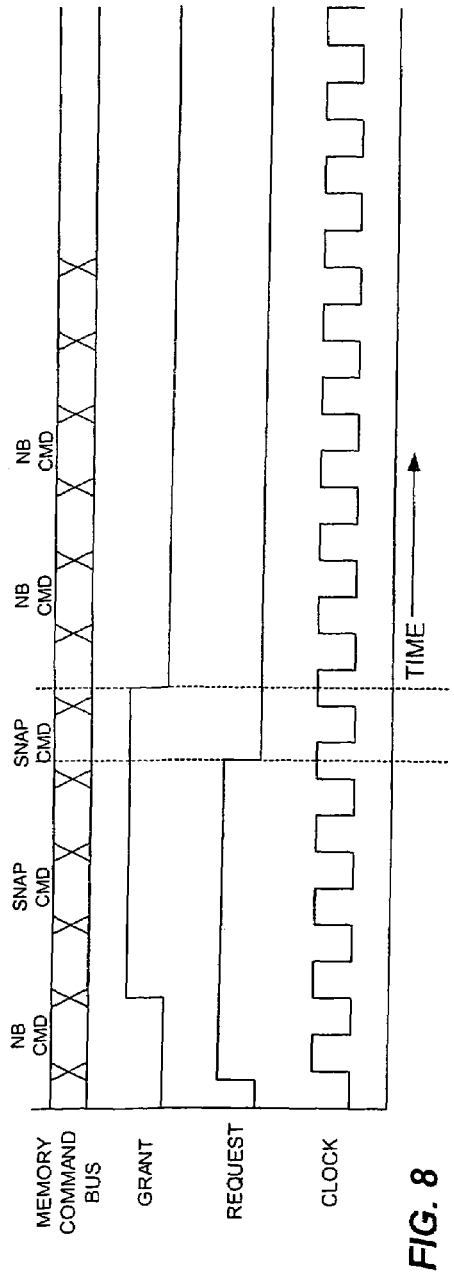
FIG. 8 shows a timing diagram of a first embodiment arbitration sequence useful in a two-wire implementation of an arbitration signal bus/port in accordance with the present invention.
Figure 9:
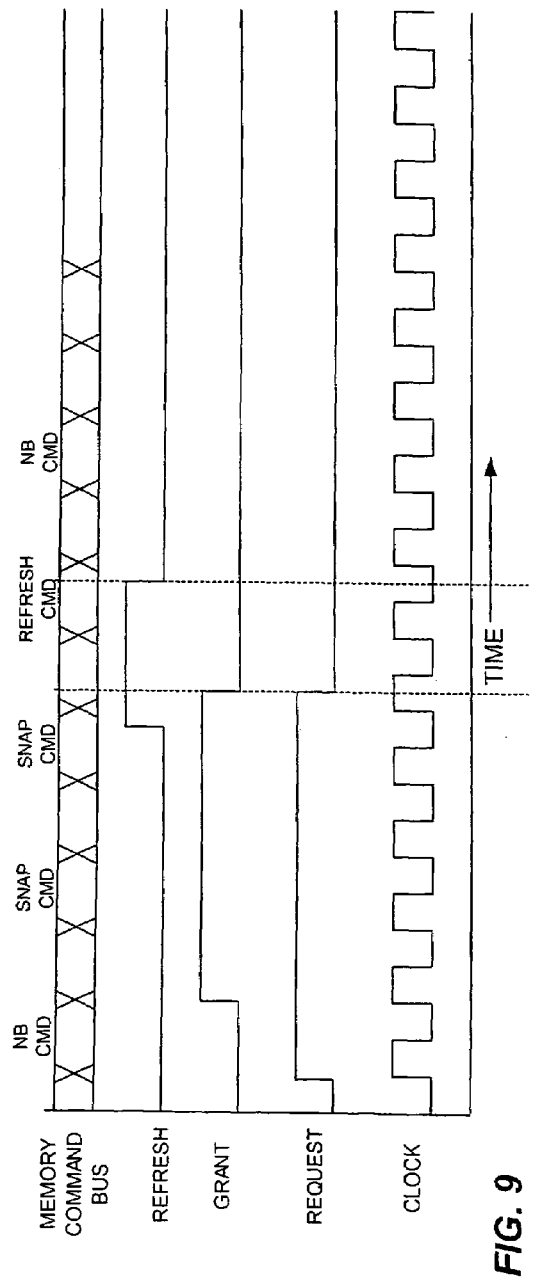
FIG. 9 shows a timing diagram of a first embodiment arbitration sequence useful in a three-wire implementation of an arbitration signal bus/port in accordance with the present invention.

FIG. 8 and FIG. 9 illustrate exemplary timing diagrams for operating a computer system in accordance with the present invention. In FIG. 8 and FIG. 9, the horizontal access represents increasing time, divided into cycles indicated by the clock signal. The vertical access represents signal level (e.g., voltage, current, or the like) indicating signal events over time. The request and grant signals in FIG. 8 indicate the state of the arbitration bus labeled "ARB" in FIG. 2–FIG. 5. The request and grant signals in FIG. 8 indicate the state of the arbitration bus labeled "ARB" in FIG. 6 and FIG. 7, while the refresh signal line in FIG. 9 indicates the state of the refresh line shown in FIG. 6 and FIG. 7. In the upper region of each timing diagram clock cycles are designated "NB CMD" to indicate a time period when a north bridge command is asserted. (i.e. a command asserted by memory and I/O controller). In cycles labeled "SNAP CMD", a SNAP device controls the arbitrated memory bus, and in cycles labeled "REFRESH CMD" in FIG. 9, the refresh mechanisms (in the north bridge component in the particular examples) control the arbitrated memory bus. For convenience, the discussion of FIG. 8 and FIG. 9 will refer to a SNAP signal as a signal generated by any of SNAP devices 212, 312, 412, 512, 612, or 712. Likewise, memory and I/O controllers 202, 302, 402, 502, 602, and 702 will be referred to as the north bridge component.

In FIG. 8, the north bridge is initially in control of the memory bus. A SNAP device asserts a REQUEST signal, which is held in a request state until a GRANT is received one or more clock cycles later. The GRANT will be generated by the arbitration logic within the north bridge component according to arbitration algorithms implemented by the particular north bridge component. Upon assertion of a GRANT signal, the SNAP device has control of the memory bus until it releases the memory bus by dropping the REQUEST line. It is contemplated that some mechanism may be provided to force the SNAP device to relinquish control of the memory bus to avoid deadlock/live-lock situations. However, in the normal operation shown in FIG. 8, the arbitration logic within the north bridge component recognizes the de-assertion of the REQUEST signal and places the GRANT line low in a subsequent clock cycle, after which, the north bridge component retains control of the memory bus until a subsequent SNAP request is handled. For conventional operation, the GRANT line is tied permanently to a signal state indicating north bridge control (e.g., low in FIG. 8) so that north bridge component retains continuous control.

In FIG. 9, the north bridge is initially in control of the memory bus. The REQUEST/GRANT protocol is largely similar to that shown in FIG. 8, however, because arbitration logic is implemented in the SNAP devices, the SNAP device must be made aware of the REFRESH state of the memory system. As shown in FIG. 9, upon detection of a REFRESH signal indicating that the north bridge component is about to perform a refresh operation, the SNAP device relinquishes control by de-asserting the REQUEST and GRANT signals. Upon completion of the refresh cycle, the SNAP can once again arbitrate for control of the memory bus by asserting a REQUEST, and awaiting a GRANT that will be generated by the north bridge component's internal arbitration mechanisms. For conventional operation, the GRANT line is tied permanently to a signal state indicating north bridge control (e.g., low in FIG. 8), and the REQUEST/REFRESH lines are unused so that north bridge component retains continuous control.

While there have been described above the principles of the present invention in conjunction with specific computing system architectures and components, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A computing system comprising:
    at least one adaptive processor;
    at least one external peripheral device;
    a memory subsystem coupled to the at least one adaptive processor and a memory controller, wherein the memory controller manages memory transactions between the memory subsystem and the at least one external peripheral; and
    at least one arbitration port coupled to the memory controller and configured to receive an external arbitration signal from the at least one adaptive processor, wherein the arbitration port in the memory controller enables the external peripheral device and the adaptive processor to share me memory subsystem without the data from the adaptive processor passing through the memory controller.

2. The computing system of claim 1 wherein the arbitration port is implemented in a north bridge component of a system chipset.

3. The computing system of claim 2 further comprising:
    a plurality of interface ports implemented by the north bridge component, each of the plurality of interface ports supporting memory transactions from external systems;
    an arbitration mechanism within the north bridge component for arbitrating amongst the plurality of interface ports for access to the memory subsystem;
    wherein the at least one arbitration port couples to the arbitration mechanism.

4. The computing system of claim 2 further comprising:
    a plurality of interface ports implemented by the north bridge component, each of the plurality of interface ports supporting memory transactions from external systems;
    an internal arbitration mechanism within the north bridge component for arbitrating amongst the plurality of interface ports for access to the memory subsystem; and
    an external arbitration mechanism coupled to provide the arbitration signal over the arbitration port to the internal arbitration mechanism.

5. The computing system of claim 1 wherein the arbitration port is implemented in a memory controller.

6. The computing system of claim 1 wherein the memory controller is integrated with the at least one processor and the arbitration port is implemented in the memory controller of the adaptive processor.

7. The computing system of claim 1 wherein multiple agents access the at least one arbitration port to conduct transactions with the memory subsystem.

8. A computing system comprising:
    at least one adaptive processor;
    at least one microprocessor;
    a memory subsystem;
    a memory bus coupled to the at least one adaptive processor, the at least one microprocessor, and the memory subsystem;
    a memory and I/O controller for managing random access of the at least one microprocessor to the memory bus;
    an arbitration mechanism coupled to the at least one adaptive processor for arbitrating access between the at least one adaptive processor and the memory and I/O controller to the memory bus;
    wherein the at least one adaptive processor accesses the memory subsystem via the memory bus through the arbitration mechanism without passing through the memory and I/O controller; and
    at least one interface port within the arbitration mechanism operable to enable an external agent to arbitrate for control of the memory subsystem, wherein the arbitration mechanism is implemented externally from the memory and I/O controller.

9. A memory and I/O controller for a computer system comprising:
    one or more memory user ports for coupling to devices that generate memory access requests;
    a memory bus port coupled to system memory;
    an arbitration mechanism operable to grant arbitrated access to the system memory by the devices that generate memory access requests; and
    an external arbitration port coupled to the arbitration mechanism, wherein the arbitration mechanism is responsive to a signal on the external arbitration port to grant arbitrated access to the system memory by an external device controlling the external arbitration port, wherein the external device comprises at least one adaptive processor,
    wherein the memory and I/O controller interfaces directly with system memory.

10. The memory and I/O controller of claim 9 wherein the arbitration mechanism is implemented within a north bridge component of a system chipset.

11. The memory and I/O controller of claim 10 wherein the external arbitration port comprises a request signal port and a grant signal port.

12. A computing system comprising:
   at least one microprocessor;
   a memory subsystem;
   a SNAP device coupled to the memory subsystem through a memory bus;
   a memory controller coupled to the microprocessor and the memory subsystem and operative to manage memory transactions between the memory subsystem and the at least one microprocessor;
   at least one arbitration port coupled to the memory controller and to the SNAP device, configured to receive an external arbitration signal; and
   a switch having one or more ports coupled to the one or more adaptive processors, the switch operable to selectively couple one of the adaptive processors to the SNAP device.

* * * * *